(12) United States Patent
Lin

(10) Patent No.: US 11,537,212 B2
(45) Date of Patent: Dec. 27, 2022

(54) ERGONOMIC KEYBOARD

(71) Applicant: CHICONY ELECTRONICS CO., LTD., New Taipei (TW)

(72) Inventor: Chung-Yao Lin, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 0 days.

(21) Appl. No.: 17/189,570

(22) Filed: Mar. 2, 2021

(65) Prior Publication Data
US 2022/0011875 A1 Jan. 13, 2022

(30) Foreign Application Priority Data
Jul. 9, 2020 (TW) .................................. 109123261

(51) Int. Cl.
*G06F 3/02* (2006.01)
(52) U.S. Cl.
CPC .......... *G06F 3/0216* (2013.01); *G06F 3/0208* (2013.01)
(58) Field of Classification Search
CPC ............................. G06F 3/0216; G06F 3/0208
See application file for complete search history.

(56) References Cited

U.S. PATENT DOCUMENTS

| | | | | |
|---|---|---|---|---|
| 5,564,844 A | * | 10/1996 | Patterson, Jr. | A47B 21/0314 400/492 |
| 8,289,684 B2 | * | 10/2012 | Hargreaves | G06F 3/0219 361/679.17 |
| 2001/0032375 A1 | * | 10/2001 | Patterson | G06F 3/0202 16/334 |

* cited by examiner

*Primary Examiner* — Towfiq Elahi
(74) *Attorney, Agent, or Firm* — Muncy, Geissler, Olds & Lowe, P.C.

(57) ABSTRACT

An ergonomic keyboard is disclosed. The ergonomic keyboard includes a first key area, a second key area and an adjustment module. The adjustment module is pivotally connected between the first key area and the second key area. The adjustment module includes a first bearing, a second bearing, a rotary knob, an adjustment screw and a supporting base. The first and second bearings are pivotally connected to the first and second key areas respectively such that they allow adjustment of an included angle. The adjusting screw is fixedly connected to the rotary knob and can be rotated together with the rotary knob. The supporting base is supported on a plane, and an internal thread of the supporting base and the adjusting screw are screwed with each other. Thus, an inclination angle of the first and second key areas can be adjusted by the rotary knob.

10 Claims, 9 Drawing Sheets ion angle.

ERGONOMIC KEYBOARD

BACKGROUND OF THE INVENTION

1. Field of the Invention

The present invention relates to an ergonomic keyboard, particularly to an ergonomic keyboard that allows simultaneous adjustment of the rotation angle and the inclination angle.

2. Description of the Related Art

With the ubiquity of computer systems, it has become a common practice for people to use keyboards. However, when people use a keyboard for a long time, the horizontal arrangement of the keys of the keyboard may cause deflection of the ulna and compress the median nerve and tendons, leading to carpal tunnel syndrome in severe cases. In addition, the palm also needs to maintain an inclination angle relative to the table top to avoid long-term cross compression of the median nerve and tendon by the radius and ulna. An ergonomic keyboard has been developed in the prior art. The placement angle of the keys of the ergonomic keyboard matches the user's hand position to reduce user discomfort. However, in the prior art, there are many restrictions on the adjustment of the angle of the ergonomic keyboard, and the user may only be allowed to adjust one of the rotation angles and the height of the keyboard, which will cause inconvenience to the user.

Therefore, it is necessary to invent a new ergonomic keyboard to solve the problems of the prior art.

SUMMARY OF THE INVENTION

The main purpose of the present invention is to provide an ergonomic keyboard which allows simultaneous adjustment of the rotation angle and the inclination angle.

To achieve the above purpose, the ergonomic keyboard of the present invention is placed on a flat surface. The ergonomic keyboard comprises a first key area, a second key area and an adjustment module. The adjustment module is pivotally connected between the first key area and the second key area. The adjustment module comprises a first bearing, a second bearing, a rotary knob, an adjustment screw and a supporting base. The first bearing is pivotally connected to the first key area by the first connecting shaft. The second bearing is pivotally connected to the first bearing and is pivotally connected to the second key area by the second connecting shaft. The first bearing and the second bearing can rotate relative to each other for adjustment of an included angle between the first key area and the second key area. The adjustment screw is fixedly connected to the rotary knob in order to rotate together with the rotary knob. The supporting base is supported on a flat surface and is provided with internal threads to screw with the adjustment screw. When the rotary knob rotates, the adjustment screw and the internal thread of the supporting base can rotate mutually for adjustment of an inclination angle between the first and the second key areas and the flat surface.

DETAILED DESCRIPTION OF THE PREFERRED EMBODIMENTS

Hereafter, the technical content of the present invention will be better understood with reference to preferred embodiments.

Figure 1A:
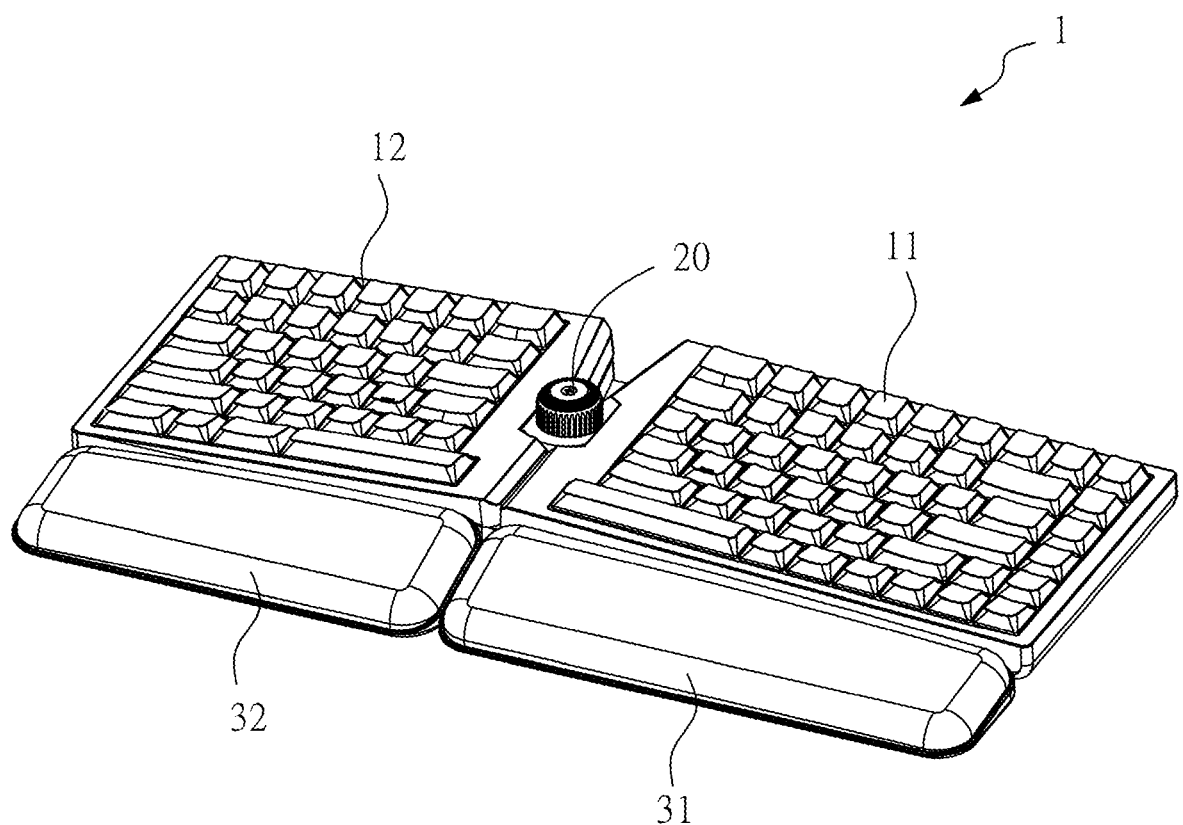
FIG. 1A is a schematic diagram of the appearance of the ergonomic keyboard of the present invention.
Figure 1B:
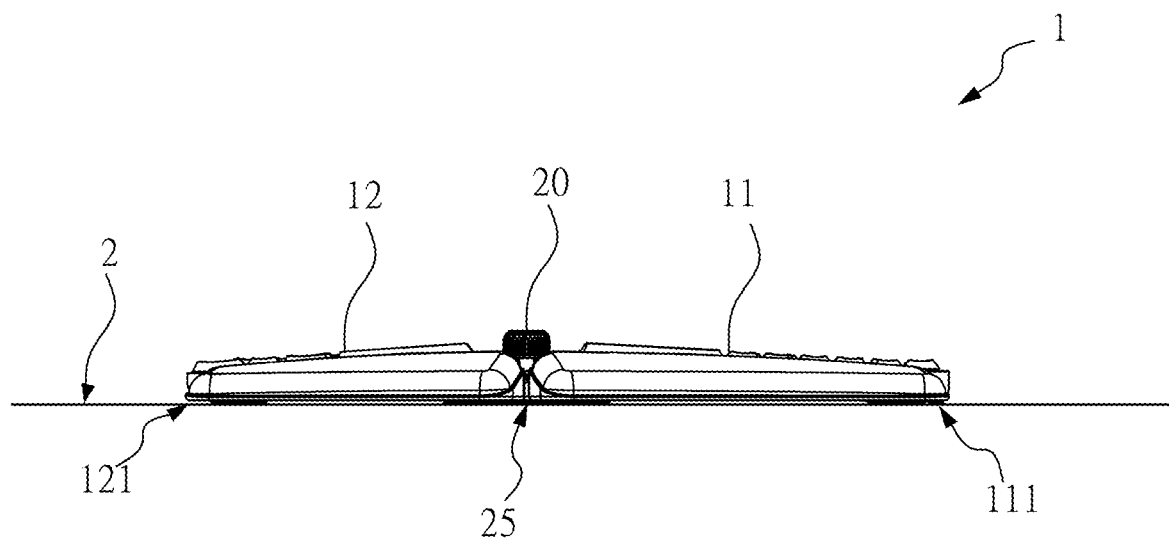
FIG. 1B is a side view of the ergonomic keyboard of the present invention.

Please refer to FIG. 1A, which is a schematic diagram of the appearance of the ergonomic keyboard of the present invention, and FIG. 1B, which is a side view of the ergonomic keyboard of the present invention.

In an embodiment of the present invention, the ergonomic keyboard 1 comprises a first key area 11, a second key area 12, an adjustment module 20, a first soft pad 31, and a second soft pad 32. The first key area 11 and the second key area 12 are provided with a plurality of physical keys. The present invention does not limit the number of keys on the first key area 11 and the second key area 12, nor does it limit the number of keys on the first key area 11 and the second key area 12 to be the same. The adjustment module 20 is arranged between the first key area 11 and the second key area 12 to pivotally connect them and allow them to rotate relative to each other for adjustment of the included angle θ1 (as shown in FIG. 5B) as well as for adjustment of the inclination angle θ2 of the first key area 11 and the second key area 12 (as shown in FIG. 6B). Prior to adjustment, the ergonomic keyboard 1 is placed on a flat surface 2. The ergonomic keyboard 1 is supported on the flat surface 2 by the first side 11 on the outermost side of the first key area 11, the second side 121 on the outermost side of the second key area 12, and the supporting base 25 of the adjustment module 20, wherein the first side 111 and the second side 121 are respectively located on the far left and far right sides of the ergonomic keyboard 1. The first soft pad 31 is fixedly connected to the first key area 11, and the second soft pad 32 is fixedly connected to the second key area 12. Therefore, when the ergonomic keyboard 1 is used, the wrists of the user can be supported by the first soft pad 31 and the second soft pad 32.

Figure 2:
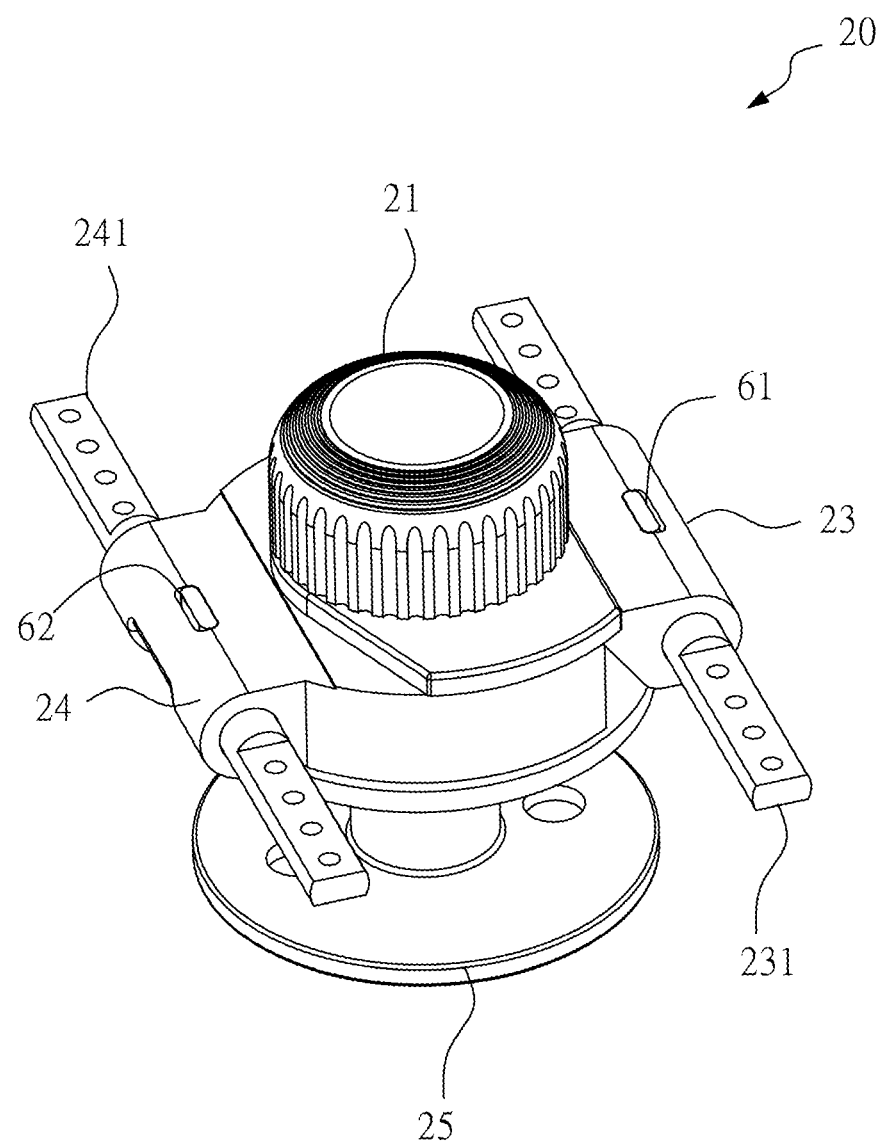
FIG. 2 is a schematic diagram of the appearance of the adjustment module of the ergonomic keyboard of the present invention.
Figure 3:
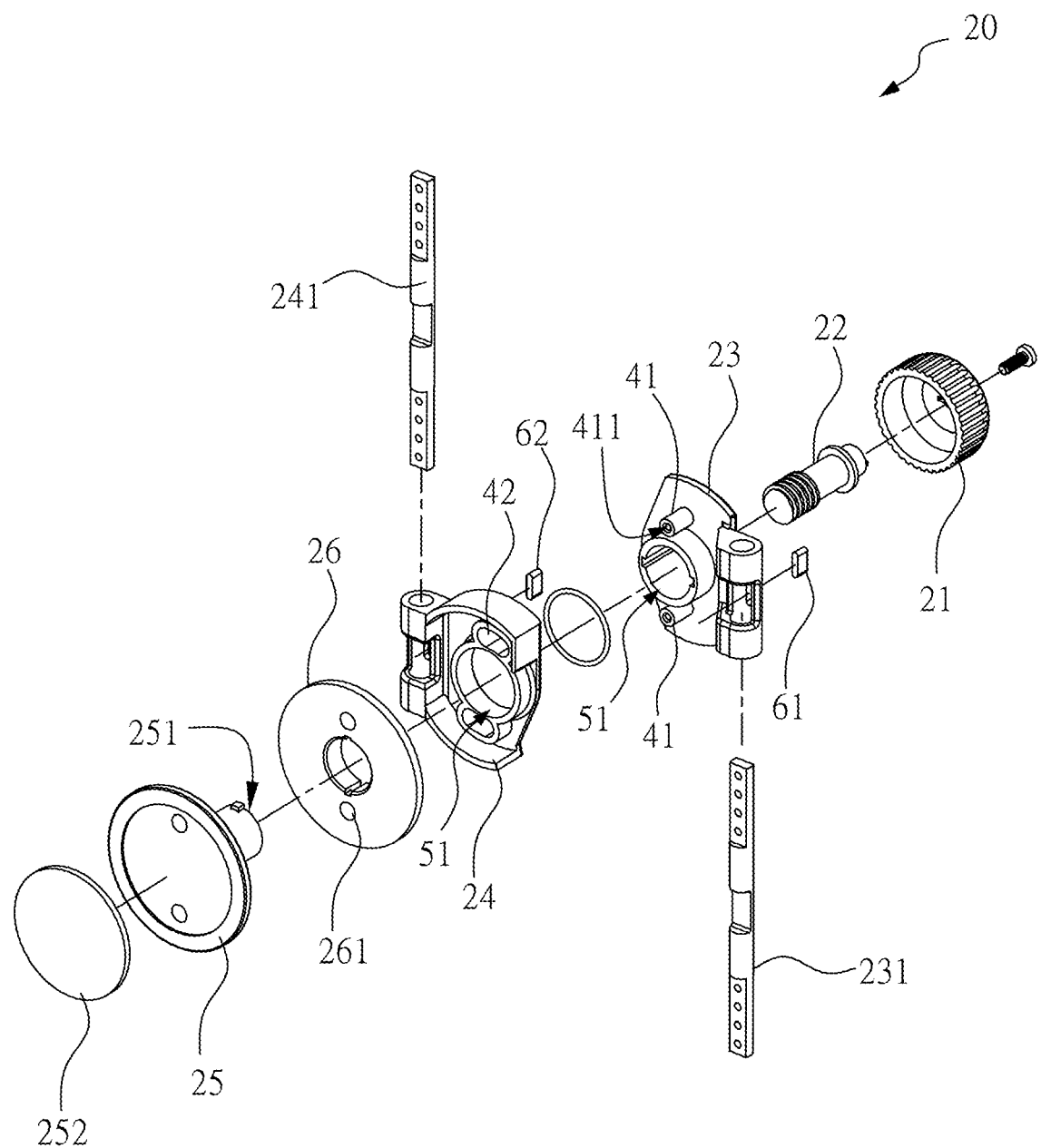
FIG. 3 is an exploded schematic diagram of the adjustment module of the ergonomic keyboard of the present invention.

Next, please refer to FIG. 2, which is a schematic diagram of the appearance of the adjustment module of the ergonomic keyboard of the present invention, and FIG. 3, which is an exploded schematic diagram of the adjustment module of the ergonomic keyboard of the present invention.

The components of the adjustment module 20 can be, from top to bottom and in order, a rotary knob 21, an adjustment screw 22, a first bearing 23, a second bearing 24, and a supporting base 25. The rotary knob 21 is fixedly connected with the adjustment screw 22, and the adjust-screw 22 is mutually screwed with the internal thread 251 of the supporting base 25 to adjust the height of the adjustment module 20 so as to change the inclination angle θ2 between the first key area 11 and the second key area 12 (as shown in FIG. 6B). The supporting base 25 can also be provided with a pad 252 for cushioning and anti-slippage effects. The first bearing 23 and the second bearing 24 are pivotally connected to each other to allow the first key area 11 and the second key area 12 to rotate relative to each other in order for adjustment of the included angle between the first key area 11 and the second key area 12. The supporting base 25 and the adjustment screw 22 are inserted through the central hole 51 of the first bearing 23 and the second bearing 24 such that when the first bearing 23 and the second bearing 24 rotate relative to each other, they will not affect the supporting base 25 and the adjustment screw 22, allowing simultaneous adjustment of the included angle θ1 and the inclination angle θ2.

Figure 4A:
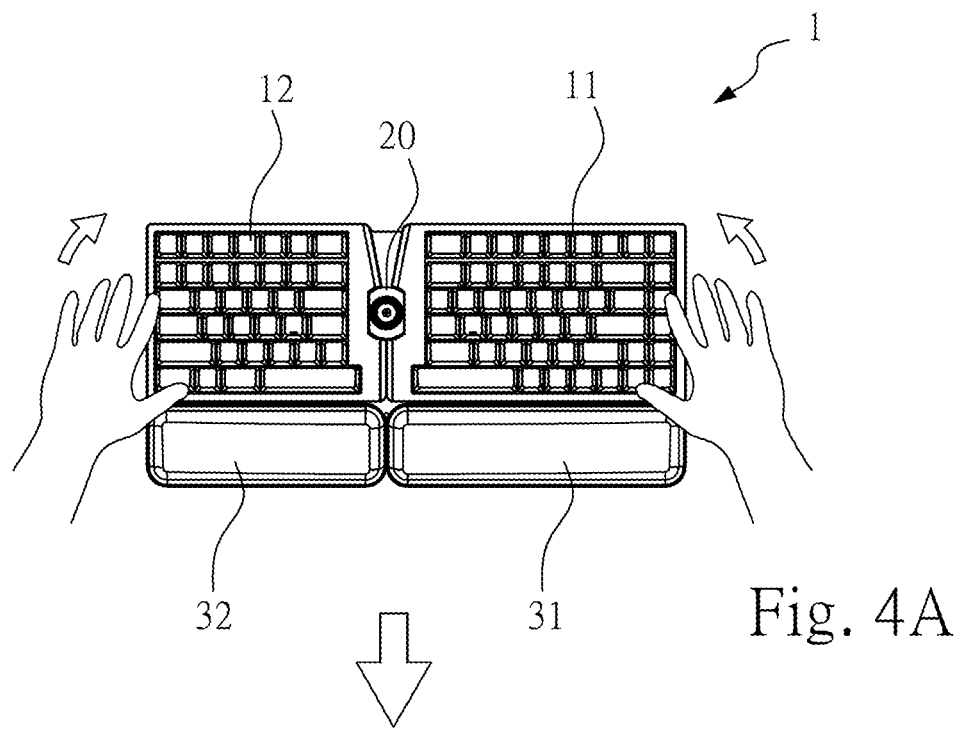
FIGS. 4A-4B are schematic diagrams for continuous operation of the ergonomic keyboard of the present invention during adjustment of the included angle.
Figure 4B:
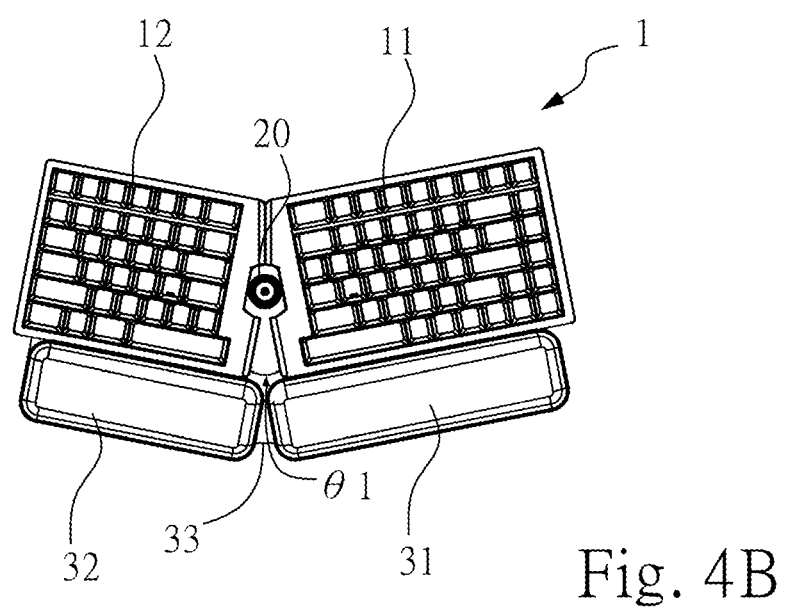
Figure 5A:
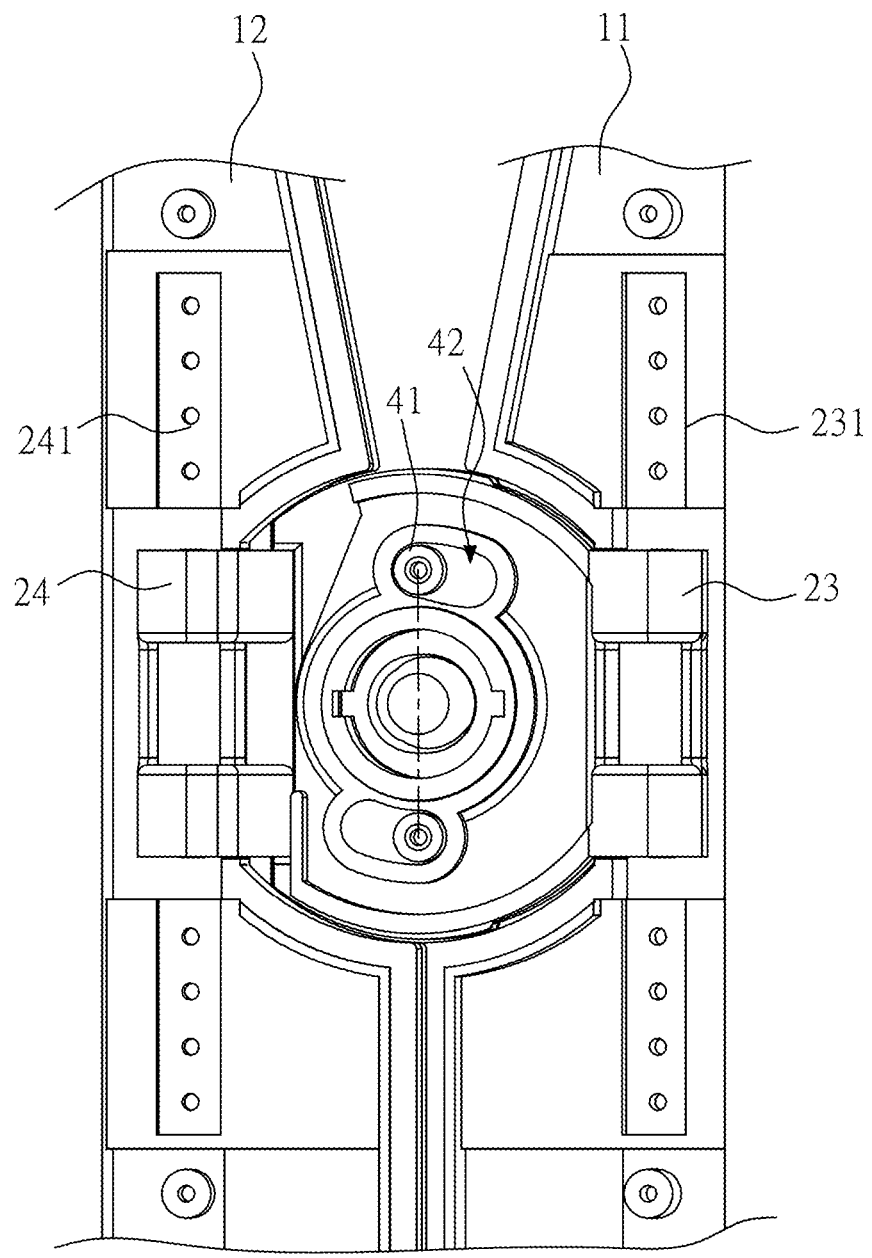
FIGS. 5A-5B are schematic diagrams for operation of the adjustment module during adjustment of the included angle of the ergonomic keyboard of the present invention.
Figure 5B:
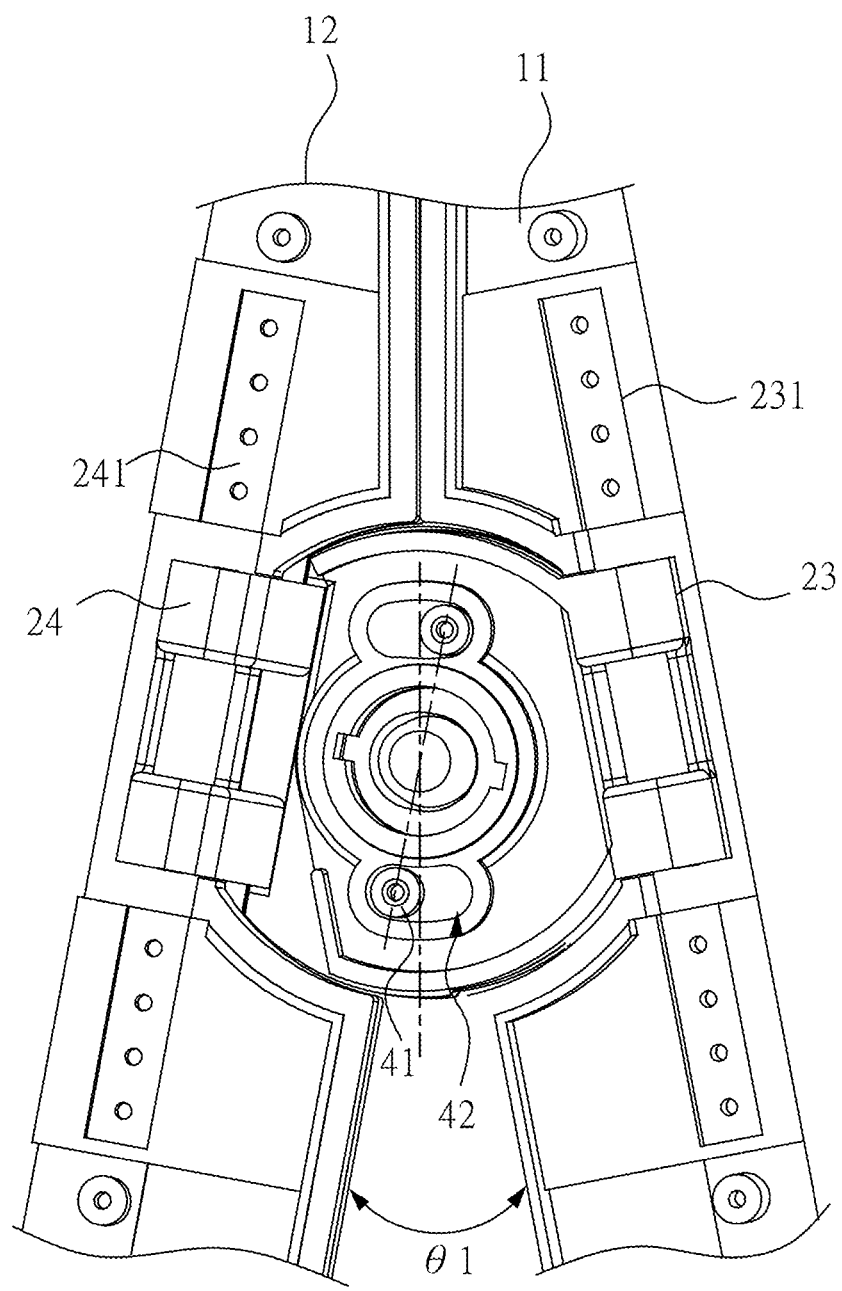

For the detailed operation mode of the adjustment module 20, please refer to the relevant diagrams in FIG. 4A to FIG. 5B, in which FIGS. 4A-4B are schematic diagrams for continuous operation of the ergonomic keyboard of the present invention during adjustment of the included angle and FIGS. 5A-5B are schematic diagrams for operation of the adjustment module during adjustment of the included angle of the ergonomic keyboard of the present invention.

The first bearing 23 is pivotally connected to the first key area 11 by a first connecting shaft 231, and the second bearing 24 is pivotally connected to the second key area 12 by a second connecting shaft 241. The first connecting shaft 231 and the second connecting shaft 241 may have a long sheet-like structure installed in the first key area 11 and the second key area 12. The first bearing 23 and the second bearing 24 are pivotally connected to each other through the adjustment screw 22 such that they can rotate relative to each other. When the first bearing 23 and the second bearing 24 rotate relative to each other, the first key area 11 and the second key area 12 can be rotated together for adjustment of the included angle θ1 between the first key area 11 and the second key area 12 (as shown in FIG. 5B). Further, the first bearing 23 may have a limiting member 41, and the second bearing 24 may have a limiting hole 42. After the first bearing 23 and the second bearing 24 are assembled, the limiting member 41 is matched with the limiting hole 42 such that when the first bearing 23 and the second bearing 24 rotate relative to each other, the limiting member 41 can move only in the limiting hole 42. In this way, the rotation range of the first bearing 23 and the second bearing 24 will be limited. The adjustment module 20 may also have a fixed seat 26 arranged under the second bearing 24. The limiting member 41 further comprises a screw hole 411, and the fixed seat 26 also has a corresponding screw hole 261. After the limiting member 41 passes through the limiting hole 42, it can be locked to the fixed seat 26 by screws or other fixing members. That is, the fixed seat 26 will be fixed to the first bearing 23 to rotate together with the first bearing 23. The fixed seat 26 can prevent the first bearing 23 and the second bearing 24 from easily being separated and can also conceal the partially-exposed structure of the first bearing 23 and the second bearing 24 to increase the aesthetic appearance.

In this way, the user can easily turn the first key area 11 and the second key area 12, as in the case of changing the shapes from FIG. 4A to FIG. 4B to change the included angle θ1 between the first key area 11 and the second key area 12. The included angle θ1 between the first key area 11 and the second key area 12 has an adjustment range of 0 to 22 degrees, but the present invention is not limited to this range. On the other hand, the first soft pad 31 and the second soft pad 32 can also be connected to each other by a connecting element 33, and a partial structure of the connecting element 33 may be arranged inside the first soft pad 31 and the second soft pad 32. While the included angle θ1 between the first key area 11 and the second key area 12 is being changed, the connecting element 33 will cooperate with the rotation of the first key area 11 and the second key area 12 to change its length and improve the stability of the angle change.

Figure 6A:
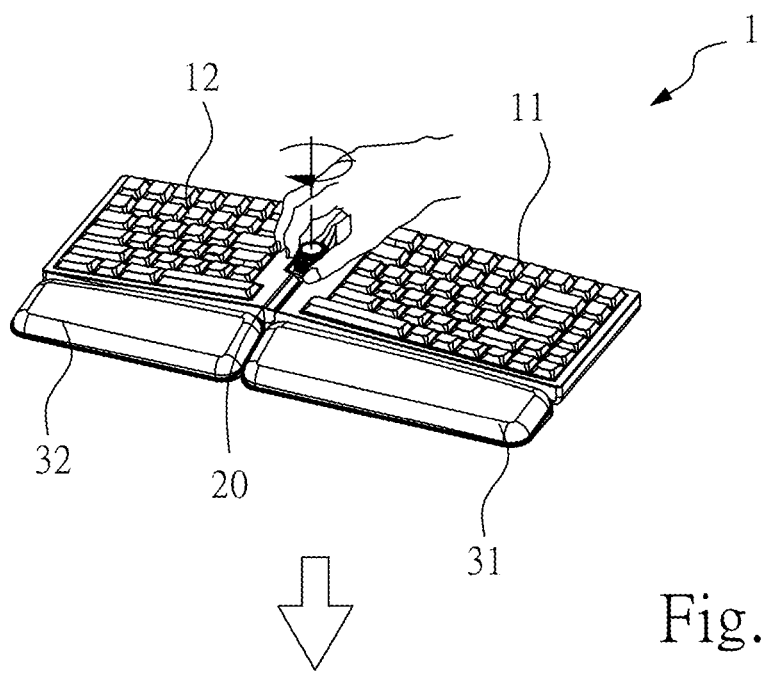
FIGS. 6A-6B are schematic diagrams for continuous operation of the ergonomic keyboard of the present invention during adjustment of the height.
Figure 6B:
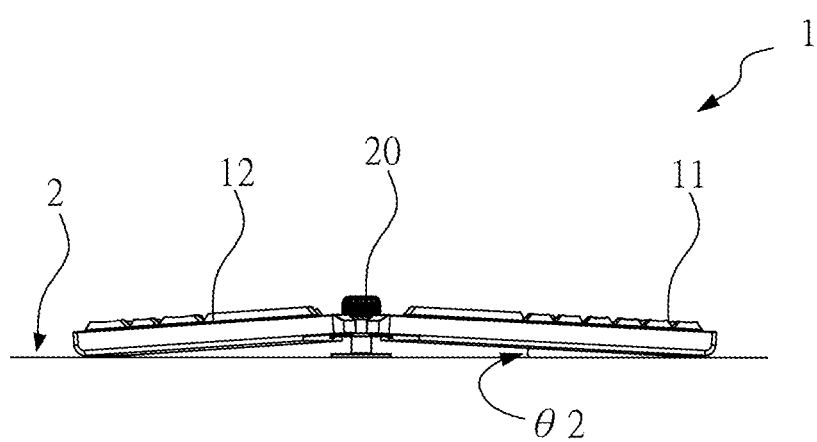
Figure 7A:
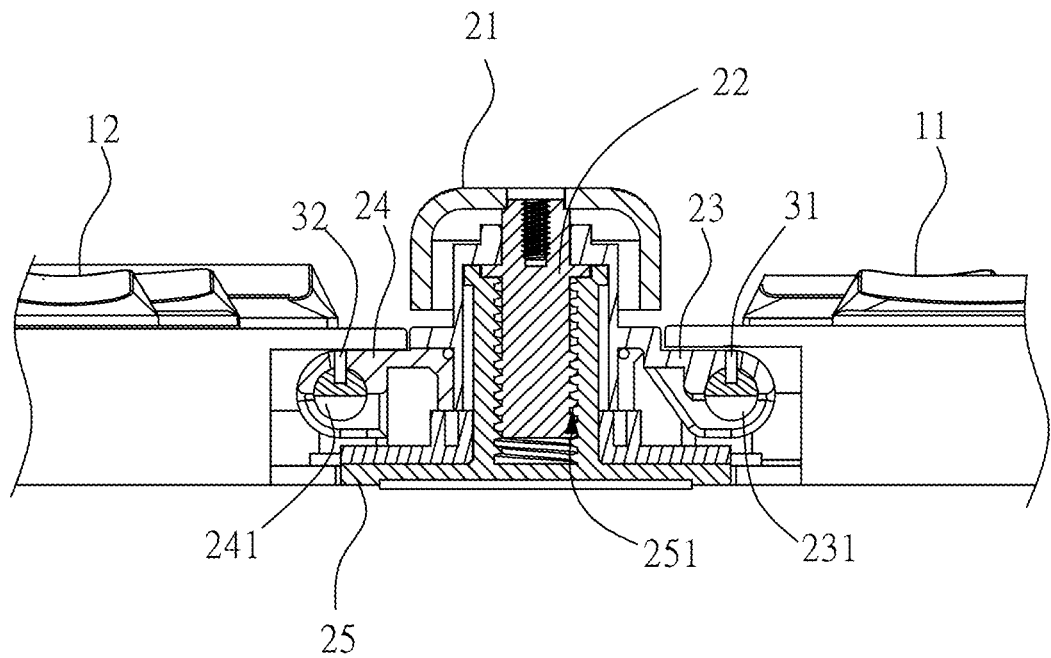
FIGS. 7A-7B are schematic diagrams for operation of the adjustment module during adjustment of the height of the ergonomic keyboard of the present invention.
Figure 7B:
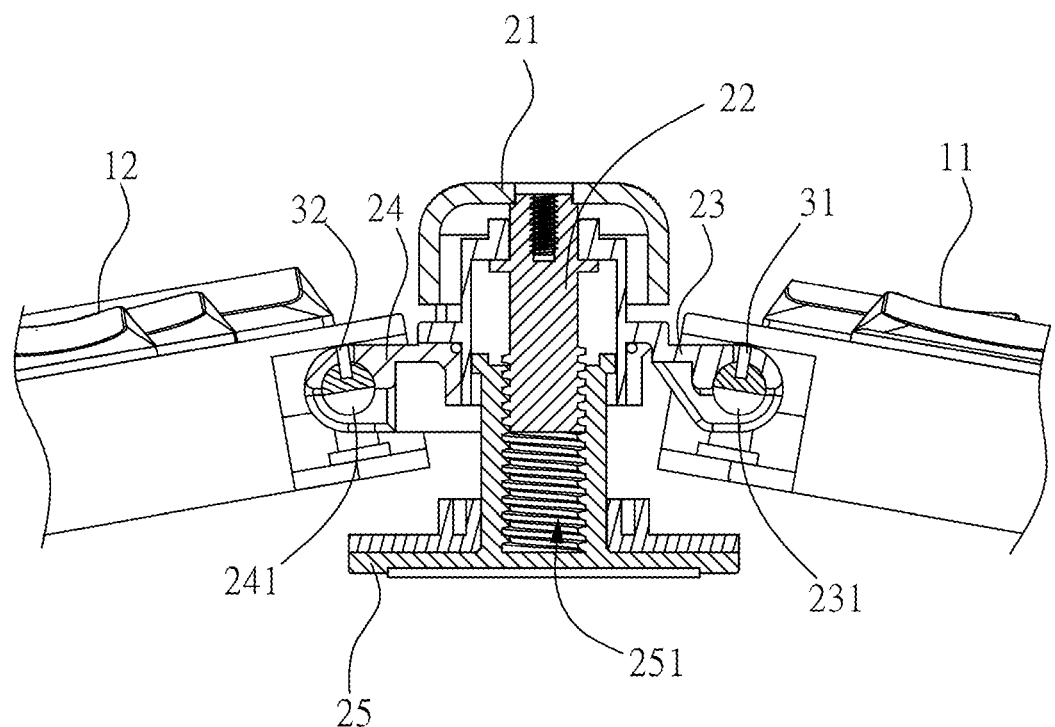

Next, please refer to the relevant diagrams in FIG. 6A to FIG. 7B, in which FIGS. 6A-6B are schematic diagrams for continuous operation of the ergonomic keyboard of the present invention during adjustment of the height, and FIGS. 7A-7B are schematic diagrams for operation of the adjustment module during adjustment of the height of the ergonomic keyboard of the present invention.

The rotary knob 21 of the present invention is fixedly connected with the adjustment screw 22 such that both can rotate together. The supporting base 25 is supported on the flat surface 2 and has internal threads 251. The internal thread 251 is screwed with the adjustment screw 22 and inserted through the central hole 51 of the first bearing 23 and the second bearing 24. When the rotary knob 21 rotates, the adjustment screw 22 rotates together with the internal thread 251 of the supporting base 25 to advance or retreat in order for adjustment of the inclination angle θ2 between the first and the second key areas 11, 12 and the flat surface 2. Furthermore, when the inclination angle θ2 is adjusted, the first side 111 of the first key area 11, the second side 121 of the second key area 12, and the supporting base 25 of the adjustment module 20 are still jointly supported on the flat surface 2. Not only one corner of the first key area 11 or the second key area 12 is supported on the flat surface 2, so the ergonomic keyboard 1 of the present invention will not tip or be unstable.

It should be noted that the ergonomic keyboard 1 also comprises a first pin 61 and a second pin 62. The first pin 61 is arranged on the first bearing 23 and interferes with the first connecting shaft 231, and the second pin 62 is arranged on the second bearing 24 and interferes with the second connecting shaft 241. Thereby, the first pin 61 and the second pin 62 can limit the rotation range of the first connecting shaft 231 and the second connecting shaft 241; that is, the first pin 61 and the second pin 62 can limit the inclination range of the first key area 11 and the second key area 12. In this way, when the ergonomic keyboard 1 is picked up, the first key area 11 and the second key area 12 will not hang down easily.

By this design, the user can easily change the inclination angle θ2 between the first and the second key areas 11, 12 and the flat surface 2 by turning the rotary knob 21, as in the case of changing the shapes from FIG. 6A to FIG. 6B. The adjustment range of the inclination angle θ2 between the first and the second key areas 11, 12 and the flat surface 2 can be 0 to 4 degrees, but the present invention is not limited to that adjustment range. Moreover, the adjustment of the inclination angle θ2 between the first and the second key areas 11, 12 and the flat surface 2 as well as the adjustment of the included angle θ1 between the first key area 11 and the second key area 12 can be performed simultaneously without affecting each other.

It can be seen that the ergonomic keyboard 1 of the present invention allows convenient adjustment of the included angle θ1 and the inclination angle θ2 to meet the needs of the user so as to achieve the purpose of protecting the user.

As described above, the objective, means, and efficiency of the present invention are all different from conventional characteristics in the prior art. It will be appreciated if the committee can review and grant a patent to benefit the society. However, it should be noted that the embodiments of the present invention described above are only illustrative. All without departing from the scope of the invention are defined solely by the appended claims.

What is claimed is:

1. An ergonomic keyboard, which is placed on a flat surface and comprises:
    a first key area;
    a second key area; and
    an adjustment module pivotally connected between the first key area and the second key area, the adjustment module comprising:
    a first bearing pivotally connected to the first key area by a first connecting shaft;
    a second bearing pivotally connected to the first bearing and pivotally connected to the second key area by a second connecting shaft; the first bearing and the second bearing can rotate relative to each other for adjustment of an included angle between the first key area and the second key area;
    a rotary knob;
    an adjustment screw fixedly connected to the rotatory knob to rotate together with the rotatory knob; and
    a supporting base supported on the flat surface; the supporting base has an internal thread, and the internal thread is screwed with the adjustment screw, wherein the supporting base and the adjustment screw are inserted through a central hole of the first bearing and the second bearing, wherein when the rotary knob rotates, the adjustment screw rotates together with the internal thread of the supporting base for adjustment of an inclination angle of the first and the second key areas with reference to the flat surface.

2. The ergonomic keyboard defined in claim 1, wherein during adjustment of the inclination angle between the first and the second key areas and the flat surface, a first side of the first key area and a second side of the second key area, together with the supporting base, are supported on the flat surface, and the first side and the second side are respectively located at the outermost side of the ergonomic keyboard.

3. The ergonomic keyboard defined in claim 1, wherein the supporting base and the adjustment screw are inserted through a central hole of the first bearing and the second bearing.

4. The ergonomic keyboard defined in claim 1, wherein the first bearing has a limiting member and the second bearing has a limiting hole; after the first bearing and the second bearing are assembled, the limiting member and the limiting hole are matched with each other such that when the first bearing and the second bearing rotate relative to each other, the limiting member can move in the limiting hole.

5. The ergonomic keyboard defined in claim 4, wherein the adjustment module has a fixed seat and the limiting member inserts through the limiting hole to be locked to the fixed seat.

6. The ergonomic keyboard defined in claim 1, further comprising:
    a first pin arranged on the first bearing such that it interferes with the first connecting shaft, thereby limiting the rotation range of the first connecting shaft; and
    a second pin arranged on the second bearing such that it interferes with the second connecting shaft, thereby limiting the rotation range of the second connecting shaft.

7. The ergonomic keyboard defined in claim 1, further comprising:
    a first soft pad connected to the first key area; and
    a second soft pad connected to the second key area.

8. The ergonomic keyboard defined in claim 7, wherein the first soft pad and the second soft pad are connected to each other by a connecting element.

9. The ergonomic keyboard defined in claim 1, wherein the included angle between the first key area and the second key area is between 0 to 22 degrees.

10. The ergonomic keyboard defined in claim 1, wherein the inclination angle between the first and the second key areas and the flat surface is between 0 to 4 degrees.

* * * * *